May 17, 1938.    J. C. SCHELLIN    2,117,456
VALVE CONSTRUCTION
Original Filed Dec. 22, 1934
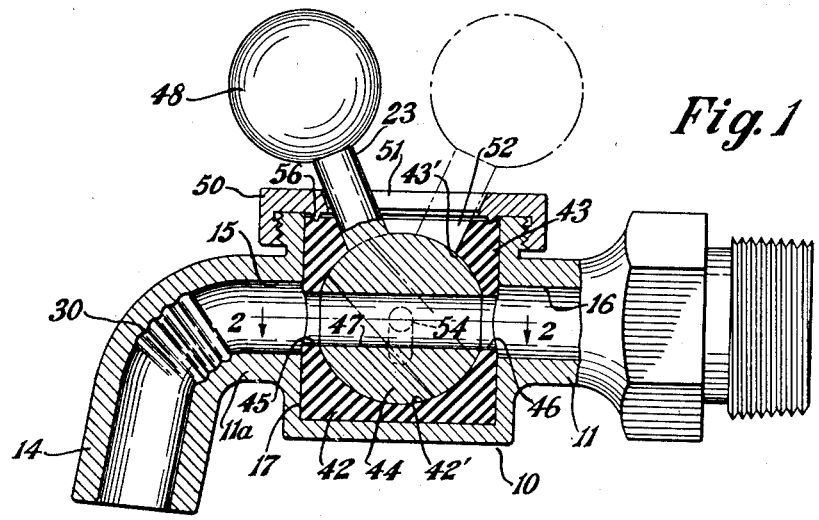
Fig.1
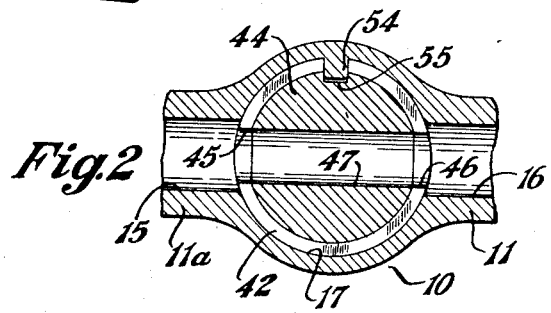
Fig.2
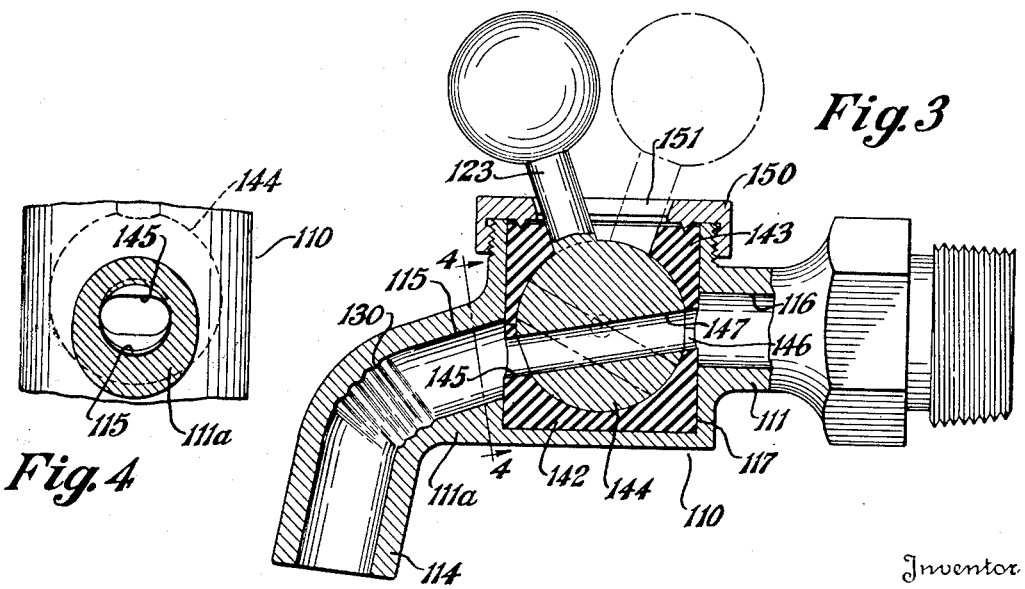
Fig.3
Fig.4
Inventor
John C. Schellin
By Freare and Bishop
Attorneys Patented May 17, 1938

2,117,456

UNITED STATES PATENT OFFICE 2,117,456

VALVE CONSTRUCTION

John C. Schellin, Wooster, Ohio, assignor to Akron Brass Manufacturing Company, Incorporated, Wooster, Ohio, a corporation of Ohio Original application December 22, 1934, Serial No. 758,789, now Patent No. 2,063,699, dated December 8, 1936. Divided and this application September 5, 1936, Serial No. 99,592

3 Claims. (Cl. 251—103)

The invention relates generally to valves for many and various uses, and more particularly to rotary valve construction employing resilient means adapted to seal the valve orifices when the valve is under pressure; and this application is a division of my copending application, Serial No. 758,789, filed December 22, 1934, entitled Valve construction, and allowed July 29, 1936, now Patent 2,063,699, December 8, 1936.

The present invention is particularly adapted for use in connection with water lines, and may include various types of nozzles, shut-offs, faucets and other fittings, such as are used on pipe or hose lines and in the plumbing art generally.

In various prior valve constructions in common use, a washer or gasket of resilient material acts as the valve or valve seat, and is subjected to a severe abrasive or screwing action in operation, or the valve seat is relatively sharp or pointed and therefore particularly susceptible to wear, or the resilient gasket is subjected directly to the abrasive action of granular or comminuted material in the pressure fluid flowing through the valve. Consequently, the resilient washer or gasket of these prior constructions is relatively short-lived and must be frequently replaced.

These prior constructions are very often difficult and/or somewhat expensive to make due to their relatively complicated design, which design is the outcome of the endeavor to overcome the above difficulties.

Accordingly, it is an object of the present invention to provide an improved valve construction having resilient sealing means which is not subjected directly to the abrasive action of the pressure fluid flowing therethrough.

Another object is to provide an improved valve construction having resilient means which is acted upon by the pressure in the line to seal the valve in closed position.

A further object is to provide an improved valve construction having resilient means providing a valve seat of relatively large area.

Another object is to provide an improved valve construction in which the resilient valve sealing means is subjected only to sliding surface contact with the valve.

A still further object is to provide an improved valve construction having resilient means which provides both a seal for the valve orifice and a seal between the valve operating means and the casing.

And finally, it is an object of the present invention to incorporate all of the foregoing advantages in a simple and compact construction which is practical and economical from a manufacturing standpoint as well as from an operating standpoint.

These and other objects are attained by the parts, combinations and improvements comprising the present invention, preferred embodiments of which are illustrated in the accompanying drawing and defined in the appended claims.

The invention may be stated in general terms as including a valve casing having an inlet port and an outlet port, a valve rotatable in the casing between the ports, valve operating means at one side of the casing, and resilient means forming a pressure seal between the valve in closed position and the casing at the outlet port, said resilient means forming a seal between the casing and the valve operating means.

Referring to the drawing forming part hereof

Fig. 1 is a sectional view of a preferred form of a faucet valve embodying the present improvements, and showing the open and closed positions of the valve;

Fig. 2 is a fragmentary cross sectional view thereof as on line 2—2, Fig. 1;

Fig. 3 is a sectional view of a modification of the valve shown in Fig. 1;

Fig. 4 is a fragmentary cross sectional view thereof on line 4—4, Fig. 3;

Similar numerals refer to similar parts throughout the drawing.

While the preferred embodiments of my invention shown in the drawing are forms of faucet valves, the present improvements may be incorporated in various other types and forms of valves and the like, without departing from the scope of the invention as defined in the appended claims.

The embodiment of faucet valve shown in Figs. 1 and 2 preferably includes the casing indicated generally at 10 having the inlet portion 11, and the outlet portion 11a which is provided with the discharge spout 14 having annular ribs 38 therein. The casing is provided with a tubular valve chamber 17 disposed transversely of and communicating with the aligned outlet and inlet ports 15 and 16 respectively.

The improved resilient sealing means preferably includes two cup-shaped sleeve members of rubber and the like, one cup-shaped member 42 fitting in the lower half of the valve chamber 17, that is, against the closed end of the valve chamber, and the other cup-shaped member 43 fitting in the upper half or open end of the valve chamber. The cup-shaped members 42 and 43 are provided with inner spherical surfaces 42' and 43' respectively, and are adapted to abut each other to form a spherical valve compartment in which the spherical valve 44 is positioned with a close sliding fit.

The cup-shaped members 42 and 43 are provided with oppositely disposed aligned semi-circular valve orifices, so that when assembled in the valve chamber 17 they form circular valve orifices 45 and 46 which register with the outlet and inlet ports 15 and 16 respectively. The valve 44 is provided with a through orifice 47 which is adapted to register with and conform to the orifices 45 and 46 when the valve is in open position, as shown in full lines in Fig. 1.

A valve stem 23 projects outwardly from one end of the valve chamber 17 and may be secured to or made integral with the valve 44. The valve stem preferably has on its outer end a ball 48 for operating the valve 44.

A closure cap 50 is provided at the open end of the valve chamber 17 and adapted to be screwed onto the wall thereof as shown, and the cap 50 is provided with a slot 51 through which the valve stem extends. A slot 52 is provided in the upper cup-shaped member 43, through which slot the valve stem extends, and the slot 52 registers with the slot 51 in the cap, the ends of the slot acting as stops to limit the movement of the valve.

A pivot pin or lug 54 is secured in or made integral with the casing wall of the valve chamber 17 and projects inwardly therefrom. The lug 54 is pivotally received or journalled in the closed upper end of a vertical slot 55 provided in the valve, the lower end of the slot being open so that the valve may be inserted downwardly in the valve chamber until lug 54 engages the top of the slot. The valve 44 may then be rotated on a transverse axis perpendicular to the axis of the valve chamber 17, from open to closed position as shown by the dot-dash lines.

The resilient cup-shaped members 42 and 43 form a pressure seal between the valve in closed position and the casing at the entrance to the outlet port 15, because the pressure in the line at the inlet side of the valve forces the valve toward the outlet side of the casing, thus forming a resilient or cushion seal between the valve and casing.

The cup-shaped members 42 and 43 are not subjected directly to the abrasive action of fluid flowing through the valve and they provide a resilient seal of relatively large area for the valve. Moreover, the resilient cup-shaped members are subjected only to sliding surface contact with the valve and not to any screwing or otherwise abrasive action which would cause rapid or undue wear.

Preferably, the under side of the closure cap 50 is provided with a V-shaped inwardly projecting annular rib 56 for engaging the top surface of the cup-shaped member 43 to form a seal between the casing and the closure cap around the valve stem 23, and the valve 44 maintains such a close sliding fit with the inner spherical surfaces of the resilient cup-shaped members as to prevent any leakage between the contacting surfaces of the valve and the cup-shaped members and out through the slots 51 and 52. Accordingly, no extra packing is required to seal the valve.

Due to the relatively small amount of movement of the valve stem 23, when the valve is turned from closed to open position, the full force of the stream of water is turned on relatively suddenly but the velocity of the stream is decreased in passing from orifice 45 to port 15, and then further decreased by the ribs 38 in order to lessen the tendency of the discharging stream toward splashing.

The embodiment shown in Fig. 3 is a slightly modified form of the valve shown in Fig. 1, and illustrates the adaptation of the valve to a construction wherein the inlet and outlet ports are not in longitudinal alignment, and wherein a shorter movement of the valve handle is desired without reducing the area of the through orifice in the valve, which would result in cutting down the volume of flow therethrough.

The embodiment in Fig. 3 includes the casing indicated generally at 110 and the inlet portion 111, outlet portion 111a and discharge spout 114 which is provided with annular ribs 138 therein. The inlet portion 111 is provided with the inlet port 116 communicating with the valve chamber 117, and the outlet portion 111a is provided with the outlet port 115 which is angularly disposed to the inlet port 116 and which communicates with the valve chamber at a point below the axis of the inlet port.

The cup-shaped members 142 and 143 are formed and positioned in the valve chamber in the same manner as in the valve construction shown in Fig. 1, with the exception that the orifices 145 and 146 are made to register with the angularly disposed outlet and inlet ports respectively, and the orifices 145 and 146 are made to have a substantially elliptical cross section as best shown in Fig. 4. The through orifice 147 in the valve 144 is made to register with and conform to the orifices 145 and 146 when the valve is in open position, so that the orifice 147 does not pass through the axial center of the valve.

The orifices 145 and 146 are so disposed that their short axes lie in the vertical plane of the axial center of the valve 144 and the axes of the ports 115 and 116, so that as the valve 144 rotates the short dimensions of the through orifice 147 moves across the short dimension of the orifices 145 and 146 and the stem 123 traverses a shorter path in moving the valve from open to closed position than in the construction of Fig. 1.

The closure cap 150 is similar to the closure cap shown in Fig. 1, except that it has a shorter slot 151 therein due to the shorter throw of the valve stem 123.

Obviously, in both embodiments of the improved valve construction, the cup-shaped sleeve members could be made of metal and a resilient cover applied to the valve for permitting rotation of the valve within the cup-shaped members and providing a seal between the valve and casing, although in this case it might be necessary to use additional packing for sealing the valve operating means.

In both embodiments of the improved valve herein shown, the resilient sealing means has a close sliding fit with the valve so as to provide a pressure seal when the valve is closed, and the water flowing through the valve acts as a lubricant between the metal of the valve and the sealing means so as to permit easy operation of the valve. Because of the lubricating effect of the water flowing through the valve the cup-shaped members in the construction of Fig. 1 will permit rotation of the valve therein and at the same time seal the valve around the valve operating means.

I claim:

1. Valve construction including a casing having an inlet passage and an outlet passage, walls forming a tubular valve chamber disposed transversely between and communicating with the passages, a pair of cup-shaped sleeve members located in and coaxial with said valve chamber and having spherical inner surfaces, said cup-shaped members having valve orifices registering with said inlet and outlet passages and each orifice having an area less than that of the registering passage, and a spherical valve slidably fitting in the spherical surfaces of the cup-shaped members and adapted to rotate on a transverse axis perpendicular to the valve chamber, said valve having a through orifice adapted to register and conform to the valve orifices in the cup-shaped members.

2. Valve construction including a casing having an inlet port and an outlet port, walls forming a tubular valve chamber disposed transversely between and communicating with the ports, a pair of cup-shaped sleeve members located in and coaxial with the valve chamber and having substantially elliptical inlet and outlet ports registering with said casing inlet and outlet ports, and a spherical valve slidably fitting in the cup-shaped members and adapted to rotate on an axis transverse to the valve chamber, said valve having a substantially elliptical through passage adapted to register and conform to the inlet and outlet ports in the cup-shaped members, whereby rotation of the valve will move its through passage across the short axes of said cup-shaped members inlet and outlet ports.

3. Valve construction including a casing having an inlet port and an outlet port, walls forming a tubular valve chamber disposed transversely between and communicating with the ports, a cup-shaped sleeve member located in and coaxial with the valve chamber and having substantially elliptical inlet and outlet ports registering with said casing inlet and outlet ports, and a valve slidably fitting in the cup-shaped member and adapted to rotate on an axis transverse to the valve chamber, said valve having a substantially elliptical through passage adapted to register and conform to the inlet and outlet ports in the cup-shaped member, whereby rotation of the valve will move its through passage across the short axes of said cup-shaped member inlet and outlet ports.

JOHN C. SCHELLIN.